(12) United States Patent
Kikuchi

(10) Patent No.: US 11,091,237 B2
(45) Date of Patent: Aug. 17, 2021

(54) DEVICE, METHOD AND PROGRAM FOR GENERATING TRAVELING ROUTE

(71) Applicant: FURUNO ELECTRIC CO., LTD., Nishinomiya (JP)

(72) Inventor: Ryota Kikuchi, Osaka (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 302 days.

(21) Appl. No.: 16/215,556

(22) Filed: Dec. 10, 2018

(65) Prior Publication Data

US 2019/0204086 A1 Jul. 4, 2019

(30) Foreign Application Priority Data

Dec. 28, 2017 (JP) .............................. JP2017-252828

(51) Int. Cl.
| | |
|---|---|
| B63B 79/40 | (2020.01) |
| B63B 49/00 | (2006.01) |
| G01C 21/20 | (2006.01) |
| G01S 19/42 | (2010.01) |
| B63J 99/00 | (2009.01) |
| G08G 3/00 | (2006.01) |

(52) U.S. Cl.
CPC .............. B63B 79/40 (2020.01); B63B 49/00 (2013.01); B63J 99/00 (2013.01); G01C 21/203 (2013.01); G01S 19/42 (2013.01); G08G 3/00 (2013.01)

(58) Field of Classification Search
None
See application file for complete search history.

(56) References Cited

U.S. PATENT DOCUMENTS

| | | | |
|---|---|---|---|
| 7,268,703 B1 | 9/2007 | Kabel et al. | |
| 8,489,321 B2 | 7/2013 | Lee | |
| 9,157,746 B2 * | 10/2015 | Bruce | ..................... G01C 21/20 |
| 9,405,445 B2 * | 8/2016 | Carnevali | ............ G09B 29/007 |
| 9,541,403 B2 * | 1/2017 | Ohmori | ................... G01C 21/20 |
| 10,746,552 B2 * | 8/2020 | Hashizume | .......... G01C 21/203 |
| 2003/0082963 A1 * | 5/2003 | Motose | ................. F02B 61/045 |
| | | | 440/2 |
| 2004/0006423 A1 * | 1/2004 | Fujimoto | ............. G05D 1/0206 |
| | | | 701/467 |
| 2004/0153222 A1 * | 8/2004 | Puchkoff | ................. B63B 49/00 |
| | | | 701/21 |
| 2006/0064242 A1 * | 3/2006 | Litvack | ................ G01C 21/203 |
| | | | 701/410 |
| 2008/0195313 A1 * | 8/2008 | Coleman | ............ G01C 21/3484 |
| | | | 701/414 |
| 2011/0313655 A1 * | 12/2011 | Litvack | .................. G01C 21/20 |
| | | | 701/426 |
| 2012/0277941 A1 * | 11/2012 | Noffsinger | ............. G01C 21/20 |
| | | | 701/21 |
| 2018/0057131 A1 * | 3/2018 | Steward | ................. B63H 25/04 |
| 2020/0049508 A1 * | 2/2020 | Carnevali | .......... G01C 21/3423 |

* cited by examiner

*Primary Examiner* — Abdhesh K Jha
(74) *Attorney, Agent, or Firm* — Studebaker & Brackett PC

(57) ABSTRACT

A traveling route generating device is provided, which may include a user interface and processing circuitry. The user interface may receive a home route that is a route on which a ship travels upon departing from a home harbor or upon returning to the home harbor, the home harbor being a location from which the ship departs. The processing circuitry may generate a traveling route between one of a destination of the ship and a current location of the ship, and a location on the home route.

17 Claims, 9 Drawing Sheets

DEVICE, METHOD AND PROGRAM FOR GENERATING TRAVELING ROUTE

CROSS-REFERENCE TO RELATED APPLICATION(S)

This application claims priority under 35 U.S.C. § 119 to Japanese Patent Application No. 2017-252828, which was filed on Dec. 28, 2017, the entire disclosure of which is hereby incorporated by reference.

TECHNICAL FIELD

The present disclosure relates to a device, method, and program for generating a traveling route.

BACKGROUND

Conventionally, technologies for generating a suitable traveling route to a destination have been developed.

Harbors for ships to anchor are located, in many cases, at a place with a complicated topography into land or a place where structures, such as breakwaters, are constructed, in order to facilitate boarding and unboarding ships, and anchoring of ships. Thus, upon a departure from and a return to a harbor, a specific route may be demanded depending on the harbor, and thereby technologies capable of generating a more suitable traveling route are longed for.

SUMMARY

The present disclosure is made in order to address the situations described above, and one purpose thereof is to provide a device, method, and program for generating a traveling route, which generates a more suitable traveling route.

According to one aspect of the present disclosure, a traveling route generating device is provided, which may include a user interface and processing circuitry. The user interface may receive a home route that is a route on which a ship travels upon departing from a home harbor or upon returning to the home harbor, the home harbor being a location from which the ship departs. The processing circuitry may generate a traveling route between one of a destination of the ship and a current location of the ship, and a location on the home route.

Thus, a suitable traveling route can be established which goes through, for example, a specific route demanded for each home harbor by the configuration of generating the traveling route between the destination of the ship or the current location thereof and the location on the home route. Therefore, a more suitable traveling route can be generated.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
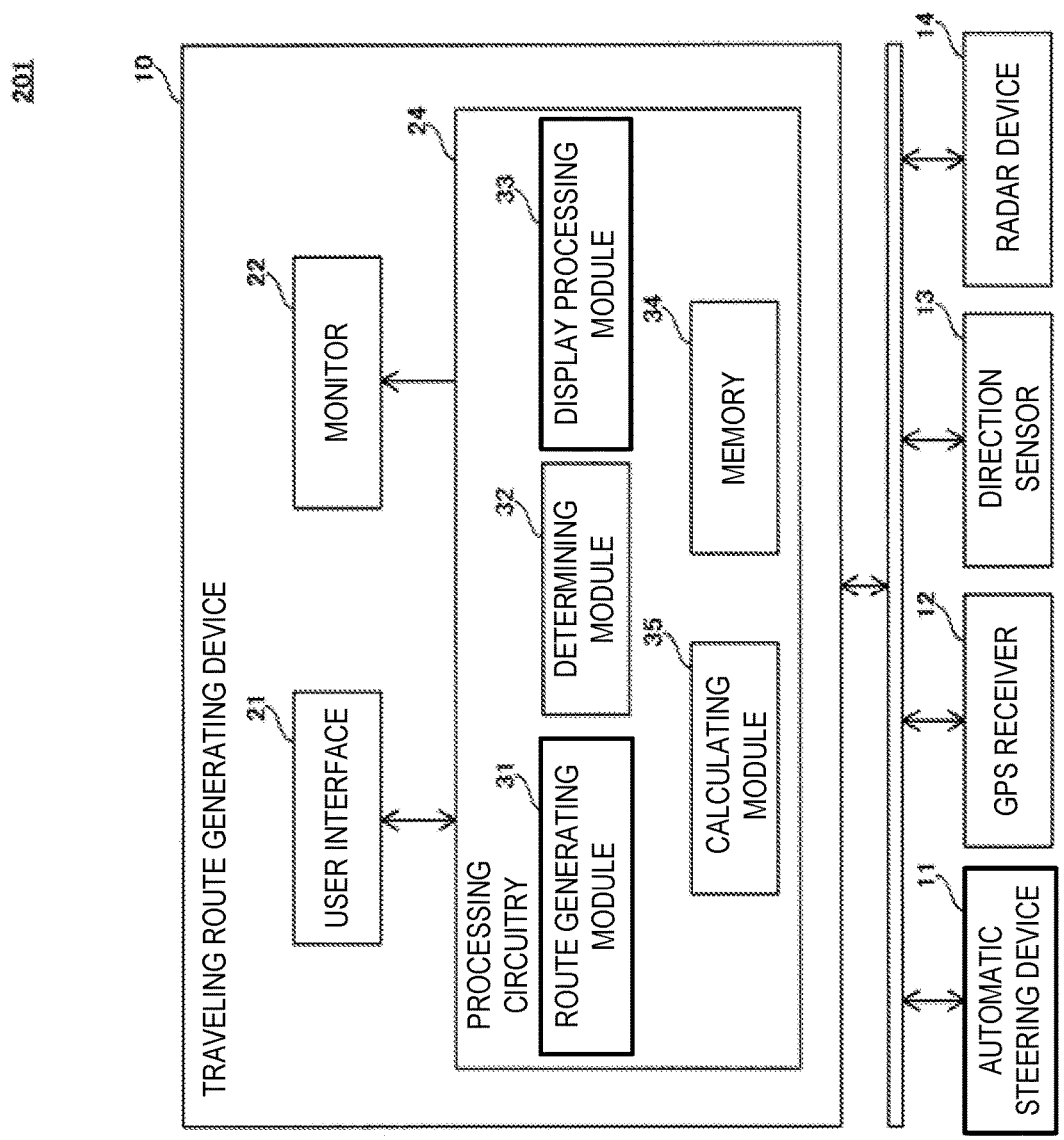
FIG. 1 is a block diagram illustrating a configuration of a traveling route generating system according to a first embodiment of the present disclosure.

Hereinafter, several embodiments of the present disclosure will be described with reference to the accompanying drawings. Note that the same reference characters are given to the same or corresponding parts throughout the drawings to omit redundant description. At least a part of the following embodiments may arbitrarily be combined.

First Embodiment

[Configuration and Basic Operation]
(Traveling Route Generating System)

FIG. 1 is a view illustrating a configuration of a traveling route generating system according to a first embodiment of the present disclosure.

Referring to FIG. 1, a traveling route generating system 201 may include a traveling route generating device 10, an automatic steering device 11, a GPS receiver 12, a direction sensor 13, and a radar device 14. These instruments are mounted on a ship and, for example, are connected with each other through a network, such as LAN (Local Area Network) or CAN (Controller Area Network) in the ship. Note that the ship provided with the traveling route generating system according the present disclosure may be herein referred to as "the ship," to be distinguished from other ships. Note that the present disclosure may be applied to ships which typically travel on water or sea and may be referred to as surface ships, and may also be applied to other types of ships, which may include boats, dinghies, watercraft, and vessels. Further, the present disclosure may also be applied, if applicable, to submarines, aircrafts, and spaceships, as well as any types of vehicles which travel on the ground, such as automobiles, motorcycles, and ATVs.

The traveling route generating device 10 may be typically installed in a control room of the ship, and display a traveling route of the ship on a monitor part 22 (which may also be referred to as a monitor)(described later). A user can easily and visually grasp the traveling route of the ship by viewing a screen displayed on the monitor part 22.

Moreover, the traveling route generating device 10 may receive an instruction of autopilot by the user, and then transmit instruction information In1 indicative of content of the instruction to the automatic steering device 11. The instruction information In1 includes route information, for example, indicative of a traveling route.

The GPS receiver 12 may receive positioning signals through GPS antennas (not illustrated) fixed to the ship to detect the current location of the ship, and then transmit positional information indicative of the detected location of the ship to the traveling route generating device 10 and the automatic steering device 11. The GPS antennas may be installed at horizontally different locations in the ship.

The direction sensor 13 may measure the bow direction or heading of the ship, for example, based on a relative relation of the locations detected by the GPS antennas, and then transmit heading information indicative of the measured heading to the traveling route generating device 10 and the automatic steering device 11.

The automatic steering device 11 may automatically operate a rudder of the ship based on, for example, the positional information of the ship received through the GPS receiver 12, the heading information received from the direction sensor 13, and the instruction information received from the traveling route generating device 10 so that the ship travels on the traveling route indicated by the instruction information In1.

The radar device 14 may generate a radar image indicative of a situation of target objects, such as other ships located around the ship by transmitting and receiving radio waves through radar antenna (not illustrated), and then transmit image information indicative of the generated radar image to the traveling route generating device 10. The traveling route generating device 10 may receive the image information from the radar device 14, and then plot and display the locations of target objects around the ship, for example, on a nautical chart displayed on the monitor part 22 based on the received image information.

Note that the traveling route generating system 201 may include, in addition to the automatic steering device 11, the GPS receiver 12, the direction sensor 13, and the radar device 14, other devices, such as AIS (Automatic Identification System) which automatically identifies other ships, a fish finder, and a terminal unit. Moreover, the traveling route generating system 201 may be provided with some of the automatic steering device 11, the GPS receiver 12, the direction sensors 13, and the radar devices 14, without being provided with all the instruments.

(Traveling Route Generating Device)

The traveling route generating device 10 may include the monitor 22, as well as a receiving part 21 (which may also be referred to as an interface or a user interface) and an information processor 24 (which may also be referred to as processing circuitry). The information processor 24 may include a route generating module 31, a determining module 32, a display processing module 33, a memory 34, and a calculating module 35.

The monitor 22 may include a touch screen occupying the entire screen or a portion thereof so that the monitor 22 functions as part of the user interface 21. The touch screen may allow the user to interact with the traveling route generating device 10 by physically touching, swiping, or gesturing on areas of the screen. The user interface 21 generally allows the user to utilize inputs to interact with the traveling route generating device 10. Inputs may include buttons, pushbuttons, knobs, jog dials, shuttle dials, directional pads, multidirectional buttons, switches, keypads, keyboards, mice, joysticks, microphones, or the like, or combinations thereof. With the user interface 21, the user may be able to control the features and operation of the monitor 22. For example, the user may be able to zoom in and out on the monitor 22 using either virtual onscreen buttons or actual pushbuttons. In addition, the user may be able to pan the image on the monitor 22 either by touching and swiping the screen of the monitor 22 or by using multidirectional buttons or dials.

Here, upon a departure from and a return to a harbor, traveling on a specific route may be required for each harbor. The term "harbor" as used herein may refer to any physical object to which the ship can anchor, such as land locations, docks, piers, and ports. In addition, a harbor from which the ship departs may be referred to as a "home harbor HB," and a specific route including the home harbor HB via which the ship travels when departing from and returning to the home harbor HB may be referred to as a "home route HR."

The user can set up the home route HR in the traveling route generating device 10 before initiating the departure or return. The traveling route generating device 10 may generate a traveling route using the home route HR set by the user.

Note that the home route HR may not include the home harbor HB, and may include a location within a given range from the home harbor HB, for example.

(a) Setup of Home Route

Figure 2:
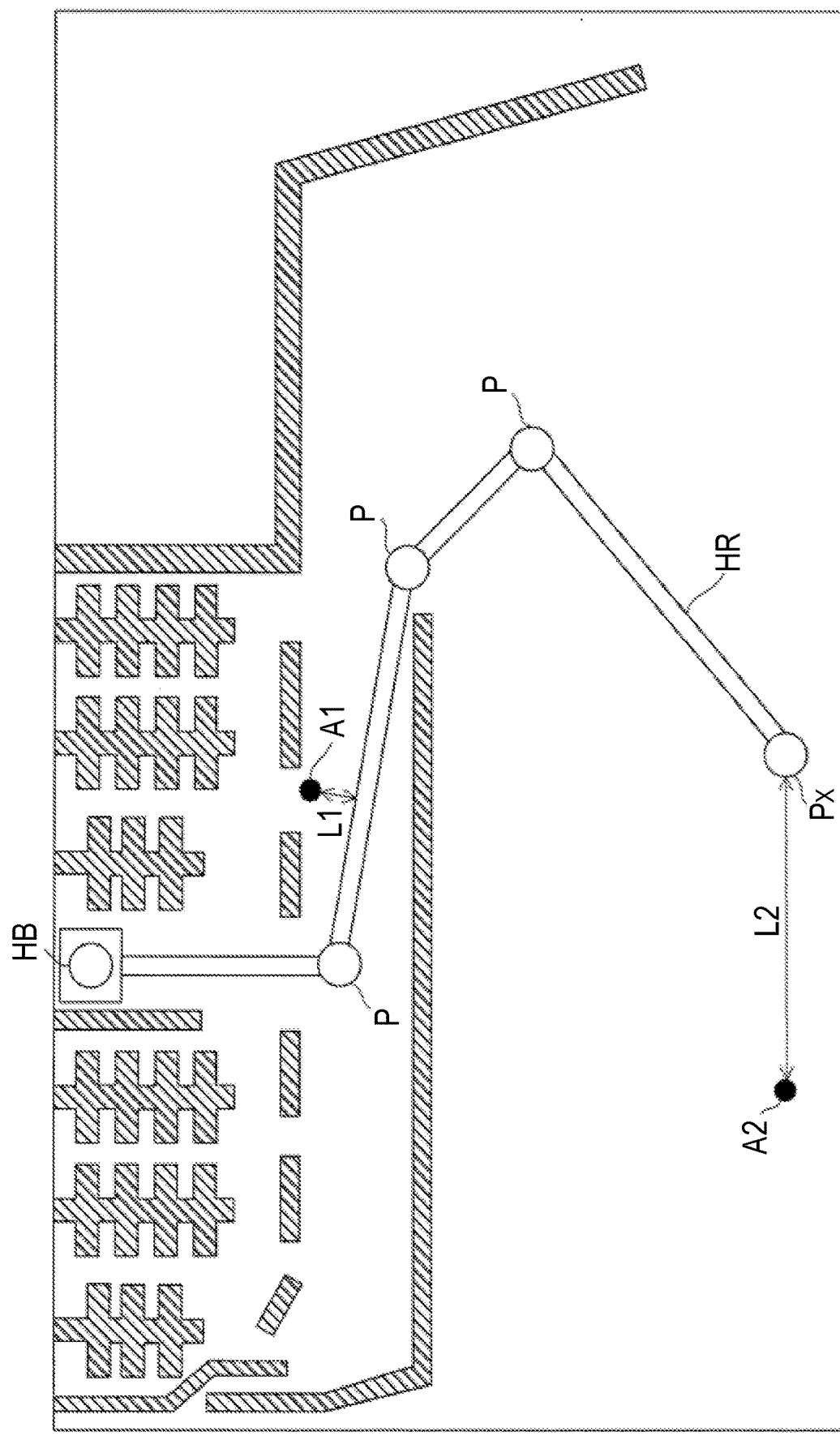
FIG. 2 is a view illustrating a home route set up in a traveling route generating device according to the first embodiment.

FIG. 2 is a view illustrating the home route set in the traveling route generating device according to the first embodiment. FIG. 2 illustrates a screen after the setup of the home route HR.

Referring to FIGS. 1 and 2, the receiving part 21 may receive the setup of the home route HR. For example, the receiving part 21 receives from the user a display instruction on a setup screen for the home route HR, and then outputs the instruction information indicative of the content of instruction to the information processor 24.

In response to a reception of instruction information In2 for instructing displaying of the setup screen of the home route HR from the receiving part 21, the display processing module 33 of the information processor 24 may perform processing to display the setup screen of the home route HR on the monitor part 22 according to the instruction information In2.

Moreover, the display processing module 33 may determine whether positional information indicative of the location of the home harbor HB is stored in the memory 34. If the positional information of the home harbor HB is not stored in the memory 34, the display processing module 33 may perform processing to display a nautical chart indicative of, for example, a given range from the current location of the ship, on the monitor part 22 as a screen for urging the user to setup the location of the home harbor HB.

When the user performs an operation for specifying the location of the home harbor HB in the nautical chart currently displayed on the monitor part 22, the receiving part 21 may output the positional information indicative of the specified location of the home harbor HB to the information processor 24.

The display processing module 33 of the information processor 24 may store in the memory 34 the positional information of the home harbor HB received from the receiving part 21.

Note that the user may set up, for example, the current location of the ship as the location of the home harbor HB, instead of specifying the location of the home harbor HB in the nautical chart displayed on the monitor part 22.

The display processing module 33 may also determine whether positional information indicative of one or more locations of heading-change points P included in the home route HR is stored in the memory 34. If the positional information of the heading-change point P is not stored in the memory 34, the display processing module 33 may perform processing to display a nautical chart including, for example, the location of the home harbor HB in the monitor part 22, as a screen for urging the user to setup the locations of the heading-change points P.

When the user specifies the locations of one or more heading-change points P in the nautical chart displayed on the monitor part 22, the receiving part 21 then may output the positional information indicative of the specified locations of one or more heading-change points P to the information processor 24.

The display processing module 33 of the information processor 24 may store in the memory 34 the positional information of the heading-change points P received from the receiving part 21.

The route generating module 31 may generate the home route HR based on the positional information of the home harbor HB and the positional information of the heading-change points P which are stored in the memory 34. For example, as illustrated in FIG. 2, the route generating module 31 generates the home route HR connecting the home harbor HB and the heading-change points P, and stores in the memory 34 home route information indicative of the generated home route HR.

Note that the user may set up in the traveling route generating device 10, for example, the locations of the plurality of heading-change points P, and may specify one of the set locations of the heading-change points P as the location of the home harbor HB, instead of setting up the home harbor HB as described above.

Alternatively, the user may select one of routes via which the ship has traveled in the past, to be registered as the home route HR.

For example, the route generating module 31 generates a traveled route of the ship based on the positional information of the ship received through the GPS receiver 12, and then stores the generated traveled route in the memory 34. In response to the reception of the instruction information In2 for instructing displaying of the setup screen of the home route HR by the user through the receiving part 21, the display processing module 33 may perform processing to display on the monitor part 22 one or more traveled routes stored in the memory 34.

When the user specifies any one of the one or more traveled routes displayed on the monitor part 22, the receiving part 21 may then output the information indicative of the specified traveled route to the route generating module 31. Then, the route generating module 31 may store in the memory 34 the traveled route indicated by the information received from the receiving part 21, as the home route HR.

Alternatively, the user may set up in the traveling route generating device 10, in addition to the home route HR, a specific route on which the ship travels to reach a location other than the home harbor HB (hereinafter, referred to as the "local route").

(b) Change of Setting of Home Route

The receiving part 21 can receive a change of the setting of the home route HR. For example, when the user performs an operation for instructing a deletion of the setting of the home route HR, the receiving part 21 outputs to the information processor 24 instruction information In3 indicative of the content of instruction by the user.

In response to a reception of the instruction information In3 from the receiving part 21, the display processing module 33 of the information processor 24 may perform processing to display on the monitor part 22 a confirmation screen for inquiring whether the user is sure about executing the deletion of the home route HR.

Then, when the input of instruction by the user confirming the deletion of the home route HR is received, the receiving part 21 may then output instruction information In4 indicative of the content of instruction to the information processor 24.

The display processing module 33 may delete the home route information stored in the memory 34 according to the instruction information In4 received from the receiving part 21.

Here, the positional information of the home harbor HB may be still stored in the memory 34. Thus, the route generating module 31 can again generate the home route HR, when the user newly sets up the locations of one or more heading-change points P, for example.

Alternatively, if the location of the heading-change point P is not newly set up, the route generating module 31 may register in the memory 34, for example, the location of the home harbor HB itself as the home route HR.

Moreover, the receiving part 21 can receive a change of the setting of the location of the home harbor HB. For example, when the user performs an operation for instructing a deletion of the setting of the location of the home harbor HB, the receiving part 21 then outputs instruction information In5 indicative of the content of instruction by the user to the information processor 24.

In response to a reception of the instruction information In5 from the receiving part 21, the display processing module 33 may perform processing to display on the monitor part 22 a confirmation screen for inquiring whether the user is sure about the deletion of the location of the home harbor HB.

When the receiving part 21 receives the input of instruction for permitting the deletion of the location of the home harbor HB from the user, it may then output instruction information In6 indicative of the content of instruction by the user to the information processor 24.

The display processing module 33 may delete the positional information of the home harbor HB stored in the memory 34 according to the instruction information In6.

(c) Creation of Departure Route

Figure 3:
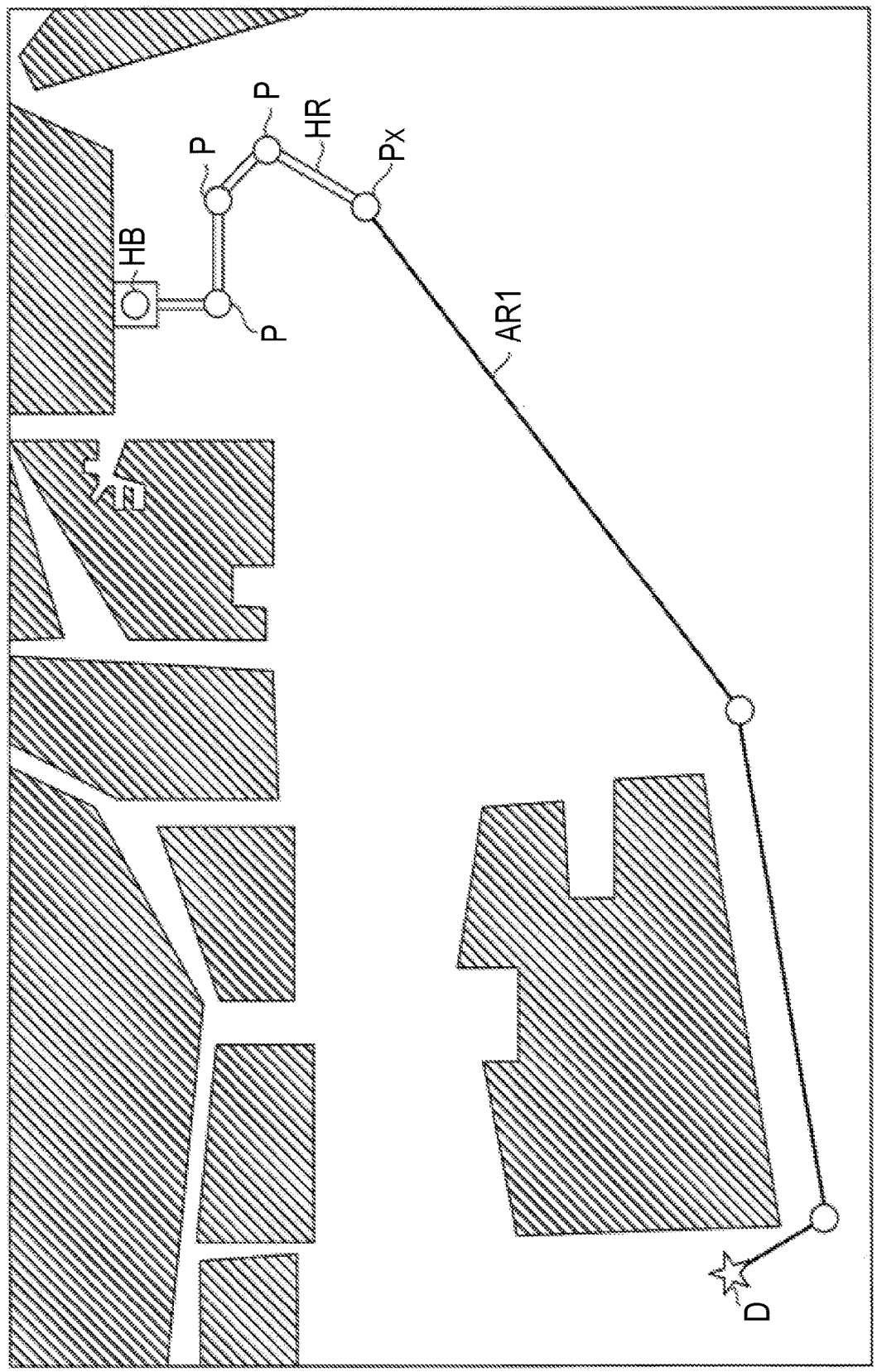
FIG. 3 is a view illustrating a traveling route generated by the traveling route generating device according to the first embodiment.

FIG. 3 is a view illustrating a traveling route generated by the traveling route generating device according to the first embodiment.

Referring to FIGS. 1 and 3, suppose that upon a departure of the ship, the user performs an operation for specifying an arbitrary location included in the nautical chart displayed on the monitor part 22 as a destination D. In this case, the receiving part 21 may output the positional information indicative of the location of the destination D specified by the user to the information processor 24.

The route generating module 31 may refer to the home route information stored in the memory 34, and then generate a traveling route from a location on the home route HR to the destination D based on positional information of the destination D received from the receiving part 21.

For example, the memory 34 stores the nautical chart information indicative of the nautical chart, the setting information on the ship, etc. The nautical chart information includes, for example, a distance from seashore and a depth at each location. The setting information includes, for example, the size of the ship.

The route generating module 31 may generate the traveling route, for example, based on the positional information of the ship received through the GPS receiver 12, the heading information received from the direction sensor 13, and the nautical chart information and the setting information stored in the memory 34.

As illustrated in FIG. 3, the route generating module 31 may generate the traveling route to the destination D from the heading-change points P included in the home route HR indicated by the home route information stored in the memory 34, i.e., the heading-change point Px located at an end of the home route HR on the opposite from the home harbor HB (hereinafter, simply referred to as "the end Px on the home route HR"). The traveling route generated in this way may be referred as the "auto route AR1."

Further, the route generating module 31 may generate a combined route by combining the home route HR with the generated auto route AR1, and output route information indicative of the generated combined route to the display processing module 33 and the calculating module 35.

The route generating module 31 can also generate an auto route AR2 from the home harbor HB to the destination D, instead of generating the auto route AR1 from the end Px on the home route HR to the destination D.

In detail, the route generating module 31 may generate either one of the auto route AR1 and the auto route AR2, according to a result of the following determination of the traveling route by the determining module 32.

For example, the determining module 32 performs a three-condition determination in which it determines whether each of a first condition, a second condition, and a third condition is satisfied.

The first condition may be that the home route information is stored in the memory 34. The second condition may be that the combination of the home route HR with the auto route AR1 is set as "Enable." For example, the user can set beforehand in the traveling route generating device 10 the combination of the home route HR with the auto route AR1 as either "Enable" or "Disable." The information indicative of "Enable" or "Disable" may be stored in the memory 34.

The third condition may be that the current location of the ship satisfies a given condition. For example, the given condition is that the distance between the current location of the ship and the home route HR is less than a threshold Th1, which is determined based on the positional information of the ship received through the GPS receiver 12 and the home route information stored in the memory 34. For example, the ship is located at a location A1 illustrated in FIG. 2, and if a distance L1 between the location A1 and the home route HR is less than the threshold Th1, the determining module 32 determines that the third condition is satisfied. On the other hand, the ship may be located at a location A2 illustrated in FIG. 2, and if a distance L2 between the location A2 and the home route HR is greater than the threshold Th1, the determining module 32 may determine that the third condition is not satisfied.

When the determining module 32 determines that all of the first condition, the second condition, and the third condition are satisfied, it may then output a determination result R1 indicating that all the conditions are satisfied to the route generating module 31.

In response to a reception of the determination result R1 from the determining module 32, the route generating module 31 may generate the auto route AR1 from the end Px on the home route HR to the destination D, as illustrated in FIG. 3. The route generating module 31 may then output to the display processing module 33 and the calculating module 35 the route information indicative of the combined route in which the home route HR is combined with the generated auto route AR1, as described above.

On the other hand, when the determining module 32 determines that at least any one of the first condition, the second condition, and the third condition is not satisfied, it may output to the route generating module 31 a determination result R2 indicating that at least any one of the three conditions is not satisfied.

In response to a reception of the determination result R2 from the determining module 32, the route generating module 31 may generate the auto route AR2 to the destination D from the home harbor HB or the current location, and then output the route information indicative of the generated auto route AR2 to the display processing module 33 and the calculating module 35.

Referring again to FIG. 1, the calculating module 35 may calculate a ship speed Sp1 recommended when traveling on the auto route AR1 or the auto route AR2 based on, for example, the route information received from the route generating module 31 and the setting information stored in the memory 34, and then output to the display processing module 33 ship speed information indicative of the calculated ship speed Sp1.

The display processing module 33 may perform processing to display a traveling route indicated by the route information received from the route generating module 31 on the monitor part 22. For example, the display processing module 33 performs processing to display on the monitor part 22 a screen where the current location of the ship and the traveling route are superimposed on the nautical chart.

Further, the display processing module 33 may display the home route HR and the auto route AR1 in a mutually different displaying manner. For example, the display processing module 33 may display the home route HR and the auto route AR1 by mutually different colors, or may display one of the home route HR and the auto route AR1 by a solid line and may display the other by a dotted line. Note that the display processing module 33 may display the home route HR and the auto route AR1 in the same displaying manner.

Further, the display processing module 33 may perform processing, for example, to display information peculiar to the traveling route, such as the ship speed Sp1 indicated by the ship speed information received from the calculating module 35. The display processing module 33 may perform processing, for example, to display on the monitor part 22 a ship speed Sp2 when the ship travels on the home route HR which is set by the user, in addition to the ship speed Sp1 when the ship travels on the auto route AR1 or the auto route AR2 which is calculated by the calculating module 35.

Further, if the user performs an operation to instruct that the route generated by the route generating module 31 is not to be displayed, the receiving part 21 may output instruction information In7 indicative of the content of instruction by the user to the information processor 24.

The display processing module 33 may perform processing to display, for example, a process where the traveling route currently displayed on the monitor part 22 is stored in an icon based on the instruction information In7 for instructing non-displaying of the traveling route, which is received from the receiving part 21, and to display the icon instead of the traveling route.

The display processing module 33 may then perform processing to display the traveling route on the monitor part 22 instead of the icon, for example, when the user performs an operation to select the icon.

Note that, if one or more local routes are setup in the traveling route generating device 10, the user may perform, by using the receiving part 21, an operation to select any one of the local routes, instead of specifying, as the destination D, an arbitrary location included in the nautical chart displayed on the monitor part 22.

In this case, the route generating module 31 may generate, for example, the auto route AR1 between the end Px on the home route HR and the heading-change point P nearest to the home route HR among the plurality of heading-change points P included in the local route selected by the user. The route generating module 31 may then generate the combined route which is a combination of the home route HR, the generated auto route AR1, and the local route.

Moreover, the auto route AR1 may be, for example, a route between the destination D and a point on the home route HR other than the end Px, which is located within a given range from the end Px, without limiting to the route between the destination D and the end Px on the home route HR. Alternatively, the home route HR and the auto route AR1 may partially overlap with each other.

When the ship is not located on the home route HR upon a departure from the harbor, the route generating module 31 may generate a route which connects the current location of the ship and a point on the home route HR other than the heading-change point P nearest to the current location or the heading-change point P nearest to the current location, as a part of the traveling route.

(d) Creation of Return-to-Harbor Route

Suppose that the user performs an operation for instructing a generation of a return-to-harbor route upon returning to the harbor. In this case, the receiving part 21 may output instruction information In8 indicative of the content of instruction by the user to the information processor 24.

In response to a reception of the instruction information In8 from the receiving part 21, the determining module 32 may perform the three-condition determination described above, and then output the determination result to the route generating module 31.

Note that the determining module 32 may perform, in response to the reception of the instruction information In8, a two-condition determination in which the determining module 32 determines whether the first condition and the second condition described above are satisfied, instead of the three-condition determination.

In this case, if the determining module 32 determines that the first condition and the second condition are satisfied, it may then output a determination result R3 indicating that the first condition and the second condition are satisfied to the route generating module 31. On the other hand, if the determining module 32 determines that at least either one of the first condition and the second condition is not satisfied, it may then output a determination result R4 indicating that at least either one of the first condition and the second condition is not satisfied to the route generating module 31.

In response to the reception of the determination result R1 indicating that the three conditions are satisfied or the determination result R3 indicating that the two conditions are satisfied from the determining module 32, the route generating module 31 may generate, for example, the auto route AR1 from the current location of the ship to the end Px on the home route HR based on the positional information of the ship received through the GPS receiver 12 and the home route information stored in the memory 34. The route generating module 31 may then generate the combined route of the generated auto route AR1 and the home route HR, and output the route information indicative of the generated combined route to the display processing module 33.

On the other hand, in response to the reception of the determination result R2 indicating that at least any one of the three conditions is not satisfied, or the determination result R4 indicating that at least either one of the two conditions is not satisfied from the determining module 32, the route generating module 31 may generate, for example, the auto route AR2 from the current location of the ship to the home harbor HB based on the positional information of the ship received through the GPS receiver 12 and the positional information of the home harbor HB stored in the memory 34. The route generating module 31 may then output the route information indicative of the generated auto route AR2 to the display processing module 33.

The display processing module 33 may perform processing to display on the monitor part 22 the traveling route indicated by the route information received from the route generating module 31. The display processing module 33 may also perform processing to display on the monitor part 22 the information peculiar to the traveling route, such as the ship speed Sp1 when the ship travels on the auto route AR1 or the auto route AR2.

The route generating module 31 may also detect that the ship approaches the home route HR by calculating the distance between the current location of the ship and the end Px on the home route HR and periodically or irregularly determining whether the distance is greater than a threshold Th2.

If the route generating module 31 detects that the ship approaches the home route HR, it may then output the detection result to the display processing module 33. In response to a reception of the detection result indicating that the ship approaches the home route HR from the route generating module 31, the display processing module 33 may perform, for example, a given notification, such as displaying on the monitor part 22 that the ship approaches the home route by a pop-up screen, or changing the color of an icon indicating the ship, which is displayed on the monitor part 22.

Note that, although the traveling route generating device 10 is comprised of the receiving part 21, the monitor part 22, and the information processor 24, the traveling route generating device 10 can still achieve the generation of the more suitable traveling route, with a minimum configuration comprised of the receiving part 21 and the route generating module 31.

[Flow of Operation]

The traveling route generating device 10 of the traveling route generating system 201 may have, for example, a computer. An arithmetic processor, such as a CPU in the computer, may read a traveling route generating program including a part or all of steps of the following flowchart from the memory 34, and execute the program. The traveling route generating program is installable from an external device or through a network. Moreover, the traveling route generating program may be commercially distributed in a state where the program is stored in a recording medium.

(Creation of Traveling Route)

Figure 4:
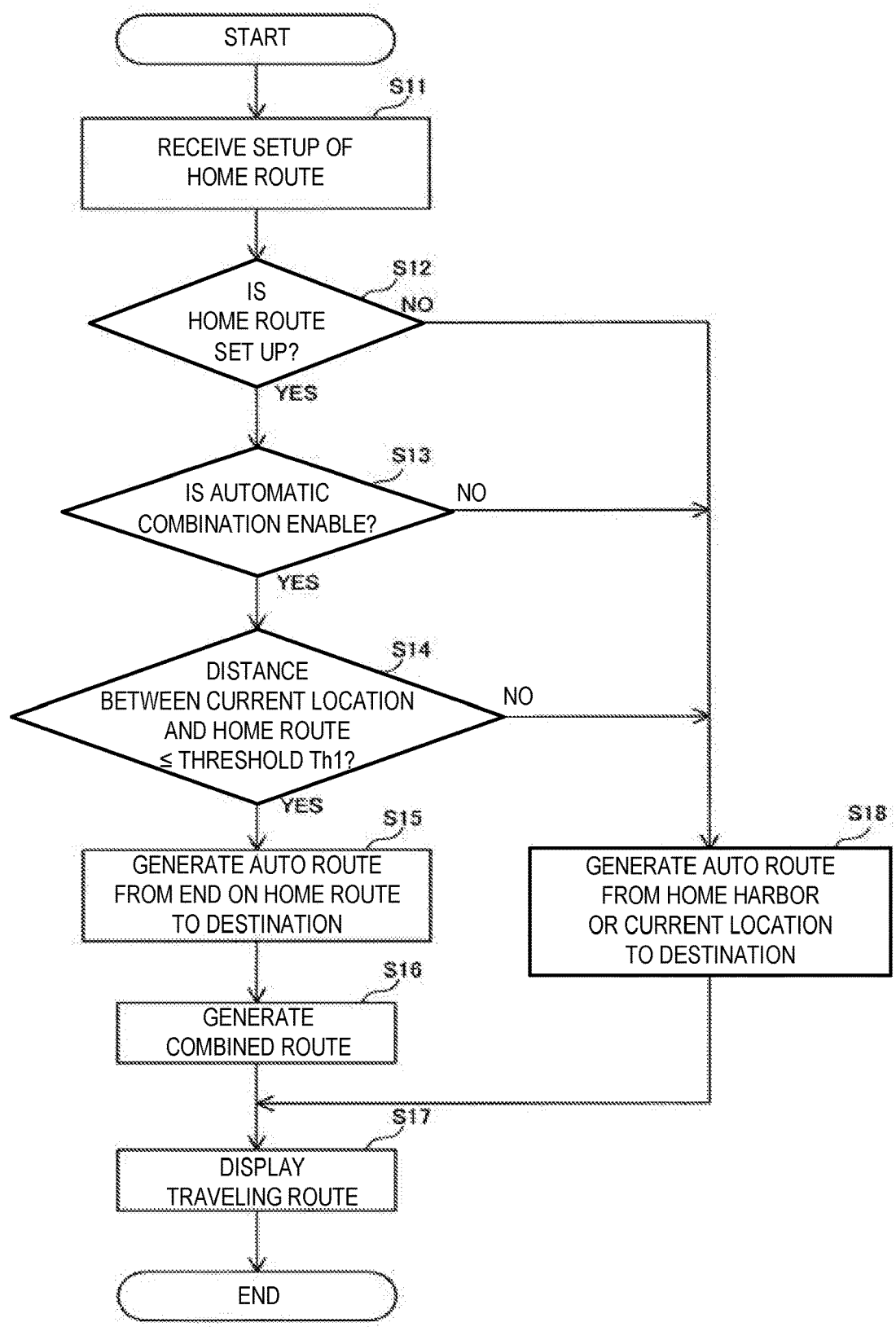
FIG. 4 is a flowchart illustrating a procedure of creating a departure route by the traveling route generating device according to the first embodiment.

FIG. 4 is a flowchart illustrating a procedure of creating the departure route by the traveling route generating device according to the first embodiment.

Referring to FIG. 4, the receiving part 21 may first receive a setup of the home route HR. That is, the receiving part 21 may output to the information processor 24 the positional information indicative of the location of the home harbor HB inputted by the user and the positional information indicative of the locations of one or more heading-change points P inputted by the user. The display processing module 33 may store the positional information in the memory 34 (Step S11).

Next, upon the departure of the ship, the determining module 32 may determine whether the home route HR is set up, i.e., whether the home route information is stored in the memory 34 (Step S12).

If the determining module 32 determines that the home route HR is set up ("YES" at Step S12), it may then determine whether the automatic combination of the home route HR with the auto route AR1 is set as "Enable" (Step S13).

Next, if the automatic combination of the home route HR with the auto route AR1 is set as "Enable" ("YES" at Step S13), the determining module 32 may then determine whether the distance between the current location of the ship and the home route HR is less than the threshold Th1 (Step S14).

If the determining module 32 determines that the distance between the current location of the ship and the home route HR is less than the threshold Th1 ("YES" at Step S14), the route generating module 31 may then generate the auto route AR1 from the end Px on the home route HR to the destination D (Step S15).

The route generating module 31 may then generate the combined route which is the combination of the home route HR and the generated auto route AR1 (Step S16).

Next, the display processing module 33 may perform processing to display the combined route generated by the route generating module 31 on the monitor part 22 as the traveling route (Step S17).

On the other hand, if the determining module 32 determines that the home route HR is not registered ("NO" at Step S12), if the determining module 32 determines that the combination of the home route HR with the auto route AR1 is set as "Disable" ("NO" at Step S13), or if the determining module 32 determines that the distance between the current location of the ship and the home route HR is greater than the threshold Th1 ("NO" at Step S14), the route generating module 31 may generate the auto route AR2 from the home harbor HB or the current location to the destination D (Step S18).

Then, the display processing module 33 may perform processing to display the auto route AR2 generated by the route generating module 31 on the monitor part 22 as the traveling route (Step S17).

Note that a similar processing may be performed upon returning to the harbor. In this case, the route generating module 31 may generate the auto route AR1 from the current location of the ship to the end Px on the home route HR at Step S15. Moreover, the route generating module 31 may generate the auto route AR2 from the current location of the ship to the home harbor HB at Step S18.

Alternatively, upon returning to the harbor, the determining module 32 may perform the two-condition determination instead of the three-condition determination. That is, the determining module 32 may not need to determine whether the distance between the current location of the ship and the home route HR is less than the threshold Th1 (Step S14).

(Determination of Whether Ship Approaches Home Route)

Figure 5:
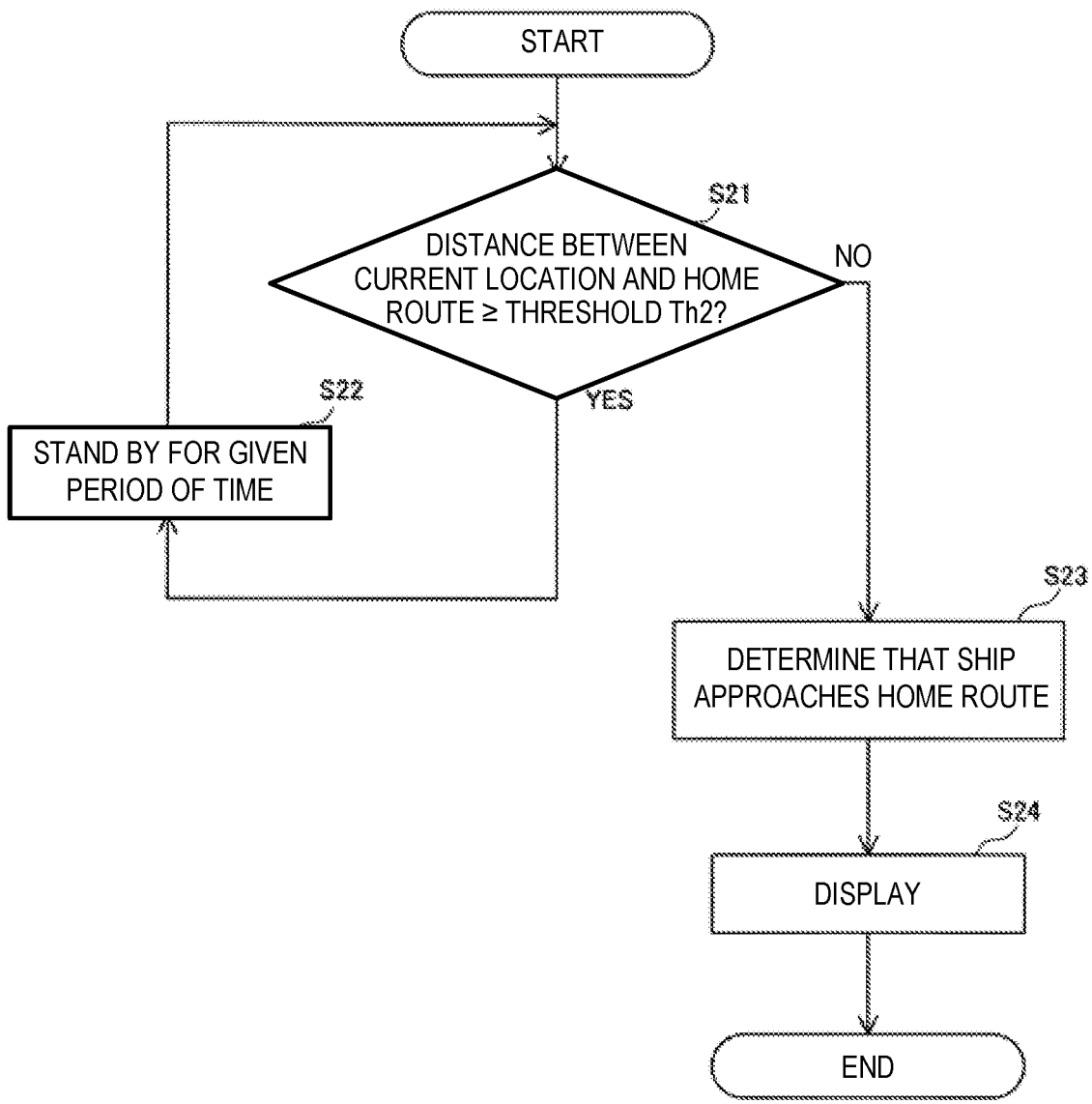
FIG. 5 is a flowchart illustrating a procedure of determining whether a ship approaches the home route by the traveling route generating device according to the first embodiment.

FIG. 5 is a flowchart illustrating a procedure of determining whether the ship approaches the home route by the traveling route generating device according to the first embodiment. The determination of whether the ship approaches the home route may be performed, for example, upon returning to the harbor, after the ship starts traveling while following the traveling route created as illustrated in FIG. 4.

Referring to FIG. 5, upon returning to the harbor, the route generating module 31 may first calculate the distance between the current location of the ship and the end Px on the home route HR, and then determine whether the distance is greater than the threshold Th2 (Step S21).

If the distance between the current location of the ship and the end Px on the home route HR is greater than the threshold Th2 ("YES" at Step S21), the route generating module 31 may stand by for a given period of time (Step S22), and then perform the determination of Step S21 again.

On the other hand, if the distance between the current location of the ship and the end Px on the home route HR is less than the threshold Th2 ("NO" at Step S21), the route generating module 31 may determine that the ship approaches the home route HR, and then output the determination result to the display processing module 33 (Step S23).

The display processing module 33 may then perform processing to display on the monitor part 22 a notification screen indicating that the ship approaches the home route HR based on the determination result received from the route generating module 31 (Step S24).

Harbors for ships to anchor are located, in many cases, at a place with a complicated topography into land or a place where structures, such as breakwaters, are constructed, in order to facilitate boarding and unboarding ships, and anchoring of ships. Thus, upon a departure from and a return to a harbor, a specific route may be demanded depending on the harbor, and thereby technologies capable of generating a more suitable traveling route may be longed for.

In terms of this situation, the traveling route generating device 10 according to the first embodiment, the receiving part 21 may receive the home route HR. The route generating module 31 may generate the auto route AR1 between the destination of the ship or the current location and the location on the home route HR received by the receiving part 21.

Thus, a suitable traveling route which goes through, for example, the specific route demanded for each home harbor HB can be established by the above configuration which generates the auto route AR1 between the destination D or the current location and the location on the home route HR. Therefore, a more suitable traveling route may be generated.

Moreover, the traveling route generating device 10 according to the first embodiment can receive the change of the home route HR by the receiving part 21.

With such a configuration, even if the home route HR is changed by some situation, the traveling route generating device 10 may receive the change of setup of the home route HR to improve the user's convenience.

Moreover, the traveling route generating device 10 according to the first embodiment may perform, by the display processing module 33, processing to display the auto route AR1 and the home route HR which are generated by the route generating module 31 in the mutually different displaying manner.

With such a configuration, the auto route AR1 and the home route HR can be easily and visually distinguished from each other by the user viewing the displayed screen.

Moreover, the traveling route generating device 10 according to the first embodiment can generate, by the route generating module 31, the auto route AR2 between the destination D or the current location and the home harbor HB. The determining module 32 may perform the determination of the traveling route. Moreover, the route generating module 31 may generate, according to the determination result from the determining module 32, either one of the auto route AR1 between the destination D or the current location and the location on the home route HR, and the auto route AR2 between the destination D or the current location and the home harbor HB.

With such a configuration, in a situation where the conditions for generating the auto route AR1 between the destination D or the current location and the location on the home route HR are not satisfied, the auto route AR2 between the destination D or the current location and the home harbor HB can be generated.

Moreover, the traveling route generating device 10 according to the first embodiment determines, by the determining module 32, whether the current location of the ship satisfies the given condition.

With such a configuration, a more suitable route may be generated among the auto route AR1 and the auto route AR2 according to the current location of the ship.

Moreover, the traveling route generating device 10 according to the first embodiment may perform, by the display processing module 33, the given notification if the distance between the current location of the ship and the home route HR is below the given value upon returning to the harbor.

With such a configuration, the user can easily grasp that the ship approaches the home route HR.

Moreover, the method of generating traveling route according to the first embodiment may first receive, by the receiving part 21, the setup of the home route HR. Next, the route generating module 31 may generate the traveling route between the destination D or the current location and the location on the received home route HR.

Thus, a suitable traveling route which goes through, for example, the specific route demanded for each home harbor HB by the method of generating the auto route AR1 between the destination D or the current location and the location on the home route HR can be established. Therefore, a more suitable traveling route may be generated.

Next, other embodiments of the present disclosure will be described with reference to the drawings.

Second Embodiment

The traveling route generating device 10 according to the first embodiment may generate the auto route AR1 between the current location of the ship or the destination D and the home route HR set by the user if the given condition is satisfied, and generate the combined route of the home route HR and the generated auto route AR1, as the traveling route.

On the other hand, the traveling route generating device 10 according to the second embodiment of the present disclosure may generate, as a device for notifying return-to-harbor information, a traveling route, and then notify a content or information based on a time at which the ship starts returning to the home harbor HB (hereinafter, referred to as the "return-to-harbor start time") based on the generated traveling route.

[Configuration and Basic Operation]
(Setting of Planned Time of Arrival)

Referring again to FIG. 1, the receiving part 21 may receive a setting of information on a planned time of arrival (PTA) at the home harbor HB. For example, the receiving part 21 receives an operation for instructing the setting of PTA at the home harbor HB by the user, and then outputs instruction information In9 indicative of the content of instruction by the user to the information processor 24.

In response to the reception of the instruction information In9 from the receiving part 21, the display processing module 33 may perform processing to display a setup screen for PTA on the monitor part 22 according to the instruction information In9.

The receiving part 21 may then receive an input of PTA by the user, and output information indicative of the inputted PTA to the information processor 24.

In response to the reception of the information from the receiving part 21, the display processing module 33 may store PTA indicated by the information in the memory 34.

Alternatively, the receiving part 21 may receive an input of times related to sunset, and tide, as the information on PTA. Alternatively, the receiving part 21 may receive a setting related to a timing of notifying the return-to-harbor start time described above. In addition, the receiving part 21 may receive a setup of whether the notification of the return-to-harbor start time is to be performed.

Figure 6:
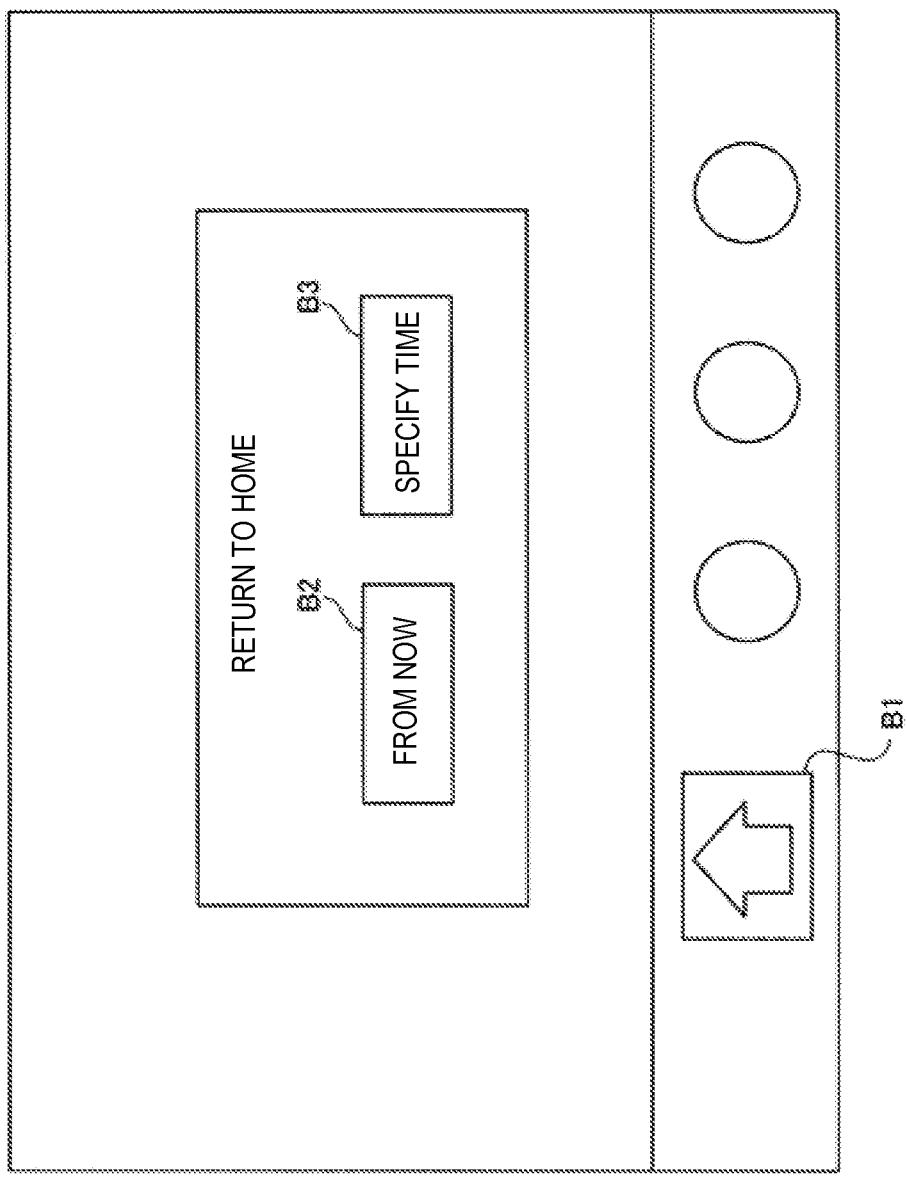
FIG. 6 is a view illustrating a setup screen for returning to the harbor, displayed on a monitor part in a traveling route generating device according to a second embodiment of the present disclosure.

FIG. 6 is a view illustrating the setup screen for returning to the harbor, which is displayed on the monitor part of the traveling route generating device according to the second embodiment.

Referring to FIG. 6, suppose that the user performed an operation, for example, to select a home button B1 currently displayed on the monitor part 22. In this case, the receiving part 21 may then output operational information indicative of the content of operation by the user to the information processor 24.

The display processing module 33 may perform processing to display, for example, a "From Now" button B2 and a "Specify Time" button B3 on the monitor part 22 according to the operational information received from the receiving part 21.

Suppose that the user performed an operation to select the "From Now" button B2. In this case, the determining module 32 may perform the three-condition determination or the two-condition determination described above. Moreover, the route generating module 31 may generate the traveling route based on the determination result from the determining module 32.

Alternatively, suppose that the user performed an operation to select the "Specify Time" button B3. In this case, the display processing module 33 may perform processing to display the setup screen of the return-to-harbor start time on the monitor part 22.

Figure 7:
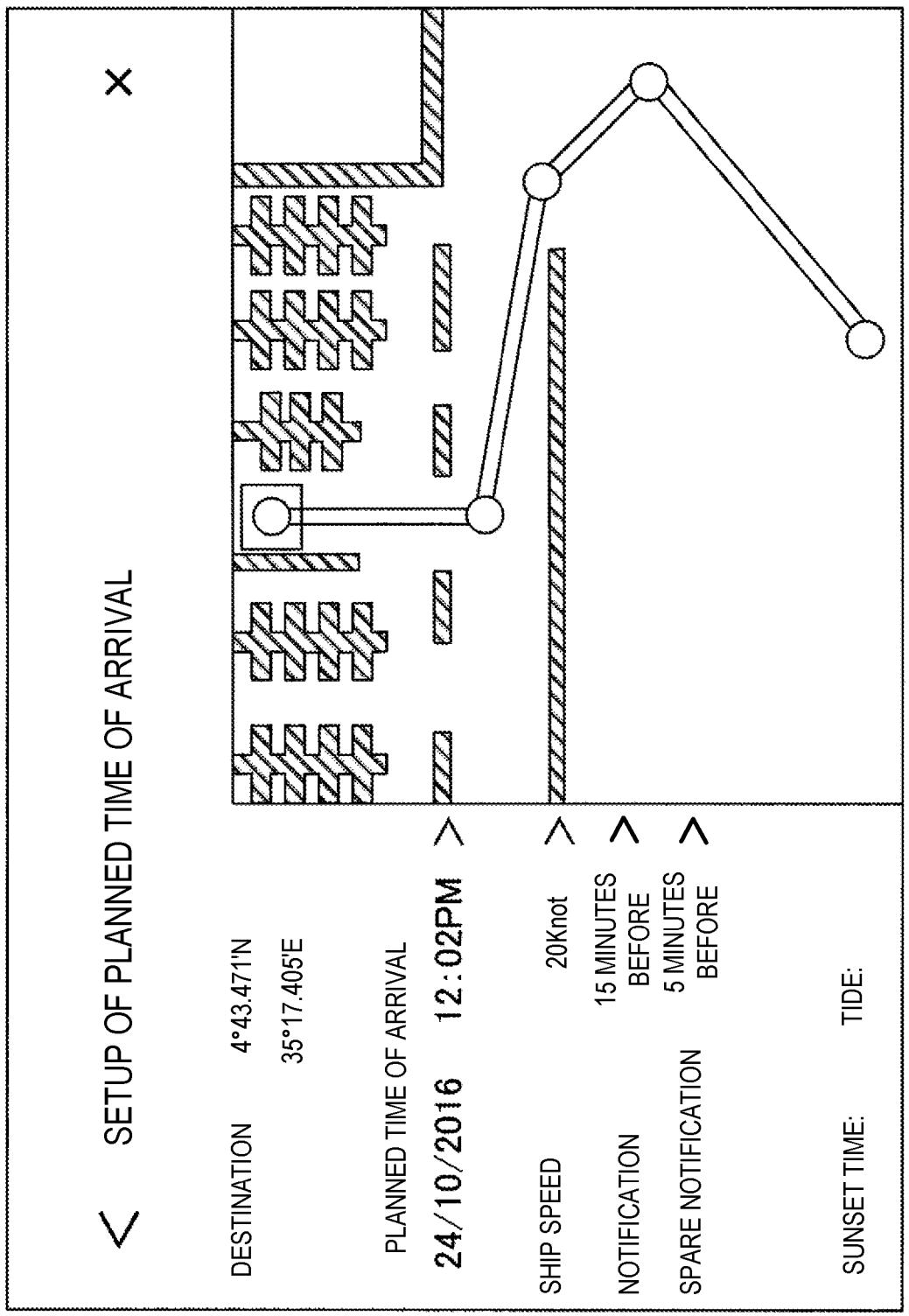
FIG. 7 is a view illustrating a setup screen of a return-to-harbor start time, displayed on the monitor part in the traveling route generating device according to the second embodiment of the present disclosure.

FIG. 7 is a view illustrating the setup screen of the return-to-harbor start time displayed on the monitor part of the traveling route generating device according to the second embodiment.

Referring to FIG. 7, for example, if the user inputted "12:02 PM on Oct. 24, 2016" into the traveling route generating device 10 as PTA, the display processing module 33 then performs processing to display the inputted PTA on the monitor part 22. Moreover, the display processing module 33 may store the inputted PTA in the memory 34.

Alternatively, suppose that the user performed an operation through the receiving part 21 to instruct that the notification of the return-to-harbor start time is to be performed 15 minutes and 5 minutes before the return-to-harbor start time. In this case, the receiving part 21 may then output instruction information In10 indicative of the content of instruction by the user to the information processor 24.

The display processing module 33 may perform processing to display on the monitor part 22 that the timings at which the notifications are to be performed are "15 minutes"

and "5 minutes" before the return-to-harbor start time based on the instruction information In10 received from the receiving part 21.

Moreover, the display processing module 33 may store in the memory 34 the information indicative of that the timings at which the notifications are to be performed are "15 minutes" and "5 minutes" before the return-to-harbor start time.

Moreover, suppose that the user performed an operation to input, for example, a sunset time, a high water time, a low water time, and the ship speed Sp1 when the ship travels on the auto route AR1. In this case, the receiving part 21 may output operational information indicative of the content of operation by the user to the information processor 24.

The display processing module 33 may perform processing to display the sunset time, the high water time, the low water time, and the ship speed Sp1 on the monitor part 22 based on the operational information received from the receiving part 21.

Moreover, the display processing module 33 may store in the memory 34 the information indicative of the sunset time, the high water time, the low water time, and the ship speed Sp1 which are set by the user.

Note that the sunset time, the high water time, and the low water time stored in the memory 34 may not be set by the user. For example, at least any one of the sunset time, the high water time, and the low water time may be stored in the memory 34, or may be calculated by the information processor 24, or may be acquired through the Internet.

(Notice of Return-to-Harbor Start)

Referring again to FIG. 1, in response to a reception of the instruction for generating the return-to-harbor route by the user, the receiving part 21 may then output the instruction information In8 indicative of the content of instruction by the user to the information processor 24.

In response to a reception of the instruction information In8 from the receiving part 21, the determining module 32 may perform the three-condition determination or the two-condition determination described above, and then output the determination result to the route generating module 31.

In response to a reception of the determination result R1 indicating that the three conditions are satisfied or the determination result R3 indicating that the two conditions are satisfied from the determining module 32, the route generating module 31 may then generate the auto route AR1 from the current location of the ship to the end Px on the home route HR. The route generating module 31 may then generate the combined route of the generated auto route AR1 and the home route HR, and output the route information indicative of the generated combined route to the display processing module 33 and the calculating module 35.

On the other hand, if the route generating module 31 receives from the determining module 32, the determination result R2 indicating that at least any one of the three conditions is not satisfied, or the determination result R4 indicating that at least either one of the two conditions is not satisfied, it may generate the auto route AR2 from the current location of the ship to the home harbor HB, and then output the route information indicative of the generated auto route AR2 to the display processing module 33 and the calculating module 35.

The route generating module 31 may update the traveling route periodically or irregularly, and then output the route information indicative of the updated traveling route to the display processing module 33 and the calculating module 35.

Note that the route generating module 31 may not have the function to generate the auto route AR1 from the current location of the ship to the end Px on the home route HR.

In response to a reception of the route information from the route generating module 31, the calculating module 35 may successively calculate a time required for traveling from the current location of the ship to the home harbor HB based on the route information and the ship speed information indicative of the ship speed Sp1 stored in the memory 34. In detail, the calculating module 35 may successively calculate the time required for traveling from the current location of the ship to the home harbor HB based on lengths of the auto route AR1 and the home route HR included in the combined route indicated by the route information, the ship speed Sp1 when the ship travels on the auto route AR1, and the ship speed Sp2 when the ship travels on the home route HR.

The calculating module 35 may then calculate PTA at the home harbor HB when assuming that the returning to the harbor is started at the present time, based on the calculated required time.

The calculating module 35 may then calculate the return-to-harbor start time based on the calculated PTA at the home harbor HB, and PTA set by the user. For example, if a difference between the calculated PTA and PTA set by the user is 1 hour, the calculating module 35 calculates a time one hour after the present time as the return-to-harbor start time.

The calculating module 35 may then calculate a notification time of the return-to-harbor start time based on the calculated return-to-harbor start time and the information indicative of the timing stored in the memory 34 at which the notification is to be performed. The calculating module 35 may then output an instruction to notify the return-to-harbor start time to the display processing module 33 at the calculated notification time.

When the route information indicative of the updated traveling route is newly received from the route generating module 31, the calculating module 35 may newly calculate the time required for traveling from the current location of the ship to the home harbor HB based on the route information. The calculating module 35 may then newly calculate the return-to-harbor start time and the notification time of the return-to-harbor start time based on the newly-calculated required time and PTA.

Note that the calculating module 35 may newly calculate the ship speed Sp1 when the ship travels on the auto route AR1, in addition to the return-to-harbor start time and the notification time of the return-to-harbor start time.

In response to a reception of the instruction to notify the return-to-harbor start time, the display processing module 33 may notify the user on the monitor part 22 content based on the return-to-harbor start time according to the instruction. As described above, the required time, the return-to-harbor start time, and the notification times of the return-to-harbor start time may be repeatedly updated. Thus, the display processing module 33 can perform the suitable notification of the return-to-harbor start time in consideration of the change in the traveling route during the travel of the ship. That is, since the generation of the traveling route, the calculation of the required time, etc. are repeatedly performed, the return-to-harbor start time etc. can suitably be notified even during the travel of the ship.

Figure 8:
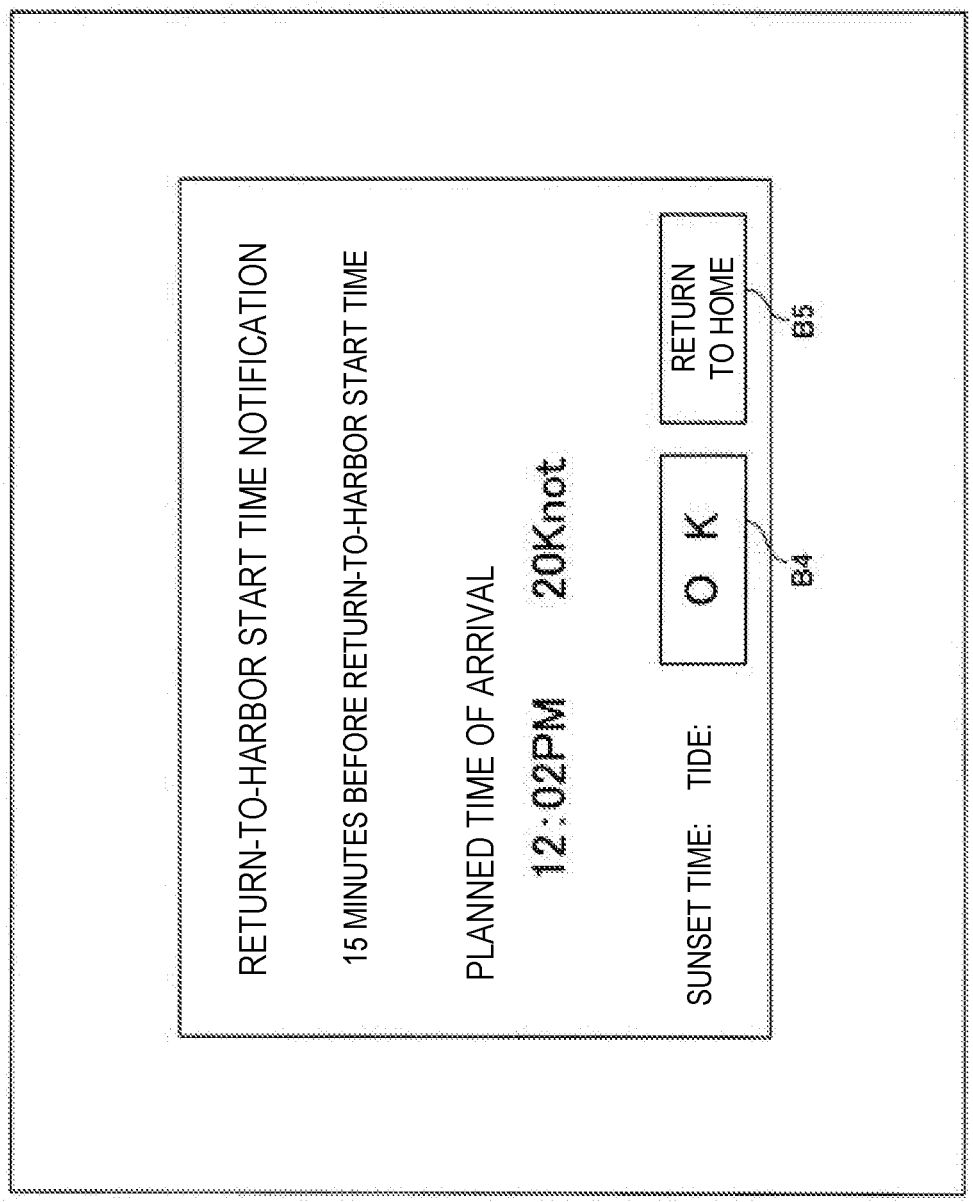
FIG. 8 is a view illustrating a notification screen of the return-to-harbor start time, displayed on the monitor part according to the second embodiment of the present disclosure.

FIG. 8 is a view illustrating a notification screen of the return-to-harbor start time displayed on the monitor part according to the second embodiment.

Referring to FIG. 8, the display processing module 33 may perform the notification of the return-to-harbor start time before the return-to-harbor start time. For example, the display processing module 33 performs processing, 15 minutes before the return-to-harbor start time, to display on the monitor part 22 that the present time is 15 minutes before the return-to-harbor start time, the calculated PTA, the sunset time, the time related to tide, and the ship speed Sp1 which are inputted by the user, an "OK" button B4, and a "Return to Home" button B5.

Thus, since the sunset time, the time related to tide, and the ship speed Sp1 are displayed on the monitor part 22, the user can decide whether he/she initiates the returning to the harbor after understanding those times and the ship speed Sp1.

When the user performs an operation to select the "Return to Home" button B5 currently displayed on the monitor part 22, the receiving part 21 may then output operational information indicative of the content of operation by the user to the information processor 24.

In response to a reception of the operational information from the receiving part 21, the display processing module 33 may perform processing to display on the monitor part 22 the traveling route generated by the route generating module 31.

On the other hand, when the user performs an operation to select the "OK" button B4 currently displayed on the monitor part 22, the receiving part 21 may then output the operational information indicative of the content of operation by the user to the information processor 24.

The display processing module 33 may perform processing to close the notification screen displayed on the monitor part 22 in response to a reception of the operational information from the receiving part 21. The display processing module 33 then performs, for example, 5 minutes before the return-to-harbor start time, processing to again display the notification screen of the return-to-harbor start time on the monitor part 22.

Note that the notification screen of the return-to-harbor start time displayed on the monitor part 22 may be a screen to display, for example, a message describing that it is near the return-to-harbor start time, instead of indicating the return-to-harbor start time itself. Alternatively, the display processing module 33 may perform processing to display the notification screen of the return-to-harbor start time, on the terminal unit (not illustrated) mounted on the ship.

Alternatively, the display processing module 33 may perform processing to display on the notification screen of the return-to-harbor start time, content from which the user can recognize the ship speed Sp1, such as a level indication corresponding to the ship speed Sp1, instead of displaying the ship speed Sp1 itself.

The calculating module 35 may determine whether the ship can return to the harbor by PTA based on the calculated required time and the PTA set by the user, and then output the determination result to the display processing module 33.

In response to a reception of the determination result from the calculating module 35, which indicates that the ship cannot return to the harbor by PTA, the display processing module 33 may perform processing to display on the monitor part 22 a notification of content based on the determination result, i.e., to display that the ship cannot return to the harbor by PTA.

In addition, if determined that the ship cannot return to the harbor by PTA, the calculating module 35 may calculate, as the recommended ship speed Sp1, a faster ship speed than the normally-calculated ship speed as described above so that the ship can return to the harbor by PTA.

Note that, although the traveling route generating device 10 is comprised of the receiving part 21, the monitor part 22, and the information processor 24, the traveling route generating device 10 can still achieve the output of the more suitable notification related to the return-to-harbor time, with a minimum configuration comprised of the receiving part 21, the route generating module 31, the calculating module 35, and the display processing module 33.

Moreover, the traveling route generating device 10 may successively calculate, by the calculating module 35, the required time to the home harbor HB and the return-to-harbor start time, without the route generating module 31 updating the traveling route.

[Flow of Operation]

The traveling route generating device 10 has, for example, the computer. The arithmetic processor, such as the CPU in the computer, may read a return-to-harbor notification program including a part or all of steps of the following flowchart from the memory 34, and execute the program. The return-to-harbor notification program is installable from an external device or through a network. Moreover, the return-to-harbor notification program may be commercially distributed in a state where the program is stored in a recording medium.

Figure 9:
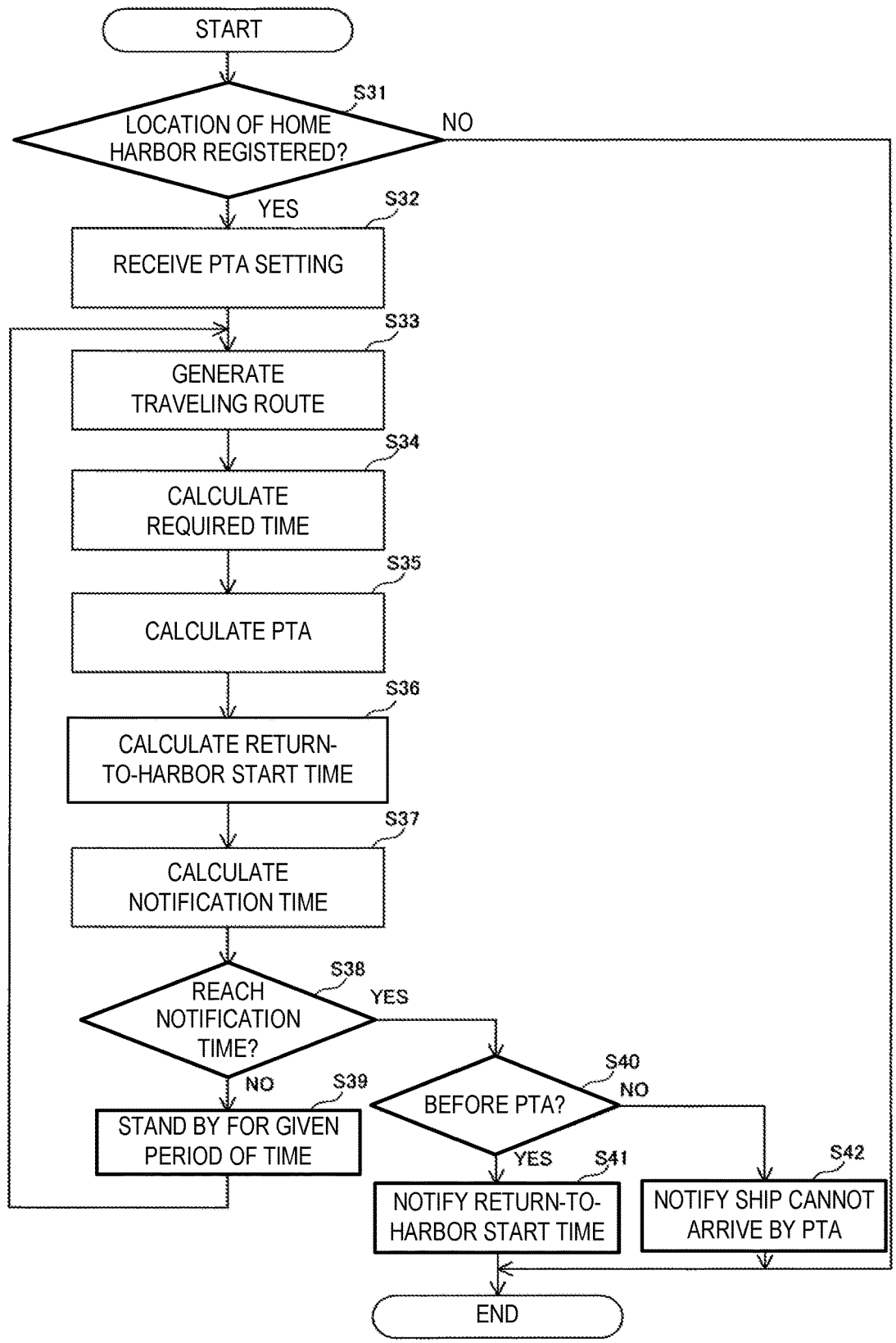
FIG. 9 is a flowchart illustrating a procedure of notifying the return-to-harbor start time by the traveling route generating device according to the second embodiment of the present disclosure.

FIG. 9 is a flowchart illustrating a procedure of notifying the return-to-harbor start time by the traveling route generating device according to the second embodiment.

Referring to FIG. 9, for example, when the user performs the operation to instruct the setting related to PTA in the setup screen related to the returning to the harbor, the receiving part 21 may first output the instruction information In9 indicative of the content of instruction by the user to the information processor 24.

In response to the reception of the instruction information In9 for instructing the setting related to PTA from the receiving part 21, the calculating module 35 may determine whether the location of the home harbor HB is registered (Step S31).

If the location of the home harbor HB is not registered ("NO" at Step S31), the calculating module 35 cannot calculate the time required for traveling from the current location of the ship to the home harbor HB, and may end the notification processing of the return-to-harbor start time.

On the other hand, if the location of the home harbor HB is registered ("YES" at Step S31), the calculating module 35 may notify the receiving part 21 that the location of the home harbor HB is registered. The receiving part 21 may receive the setting of PTA by the user, and then store the information indicative of PTA in the memory 34 (Step S32).

Note that the reception of the setting of PTA may be performed before the determination of whether the location of the home harbor HB is registered (Step S31).

Next, the route generating module 31 may generate the auto route AR1 from the current location of the ship to the end Px on the home route HR based on the home route information stored in the memory 34. The route generating module 31 may then generate the combined route of the auto route AR1 and the home route HR as the traveling route (Step S33). Note that the route generating module 31 may update the traveling route periodically or irregularly.

Next, the calculating module 35 may calculate the time required for traveling from the current location of the ship to the home harbor HB based on the traveling route generated by the route generating module 31 and the ship speed information stored in the memory 34 (Step S34).

The calculating module 35 may calculate PTA at the home harbor HB when assuming that the returning to the harbor is started at the present time, based on the calculated required time (Step S35).

The calculating module 35 may then calculate the return-to-harbor start time based on the calculated PTA at the home harbor HB, and PTA set by the user (Step S36).

Next, the calculating module 35 may calculate the notification time of the return-to-harbor start time based on the calculated return-to-harbor start time, and the timing at which the notification is to be performed, set by the user (Step S37).

The calculating module 35 may then determine whether the present time reaches the notification time (Step S38).

If the present time has not reached the notification time ("NO" at Step S38), the calculating module 35 may stand by for the given period of time (Step S39), and when the traveling route is updated by the route generating module 31 (Step S33), the calculating module 35 may newly calculate the time required for traveling from the current location of the ship to the home harbor HB based on the traveling route updated by the route generating module 31 (Step S34), and processings at and after Step S35 may be performed.

On the other hand, when the present time reaches the notification time ("YES" at Step S38), the calculating module 35 may determine whether the present time is before PTA (Step S40).

If the present time is before PTA ("YES" at Step S40), the calculating module 35 may then output the instruction for notifying the return-to-harbor start time to the display processing module 33. In response to the reception of the instruction for notifying the return-to-harbor start time from the calculating module 35, the display processing module 33 may perform processing to display the return-to-harbor start time on the monitor part 22 according to the instruction (Step S41).

On the other hand, if the present time is after PTA ("NO" at Step S40), the calculating module 35 may then determine that the ship cannot return to the harbor by PTA, and output the determination result to the display processing module 33. In response to the reception of the determination result indicating that the ship cannot return to the harbor by PTA from the calculating module 35, the display processing module 33 may perform processing to display that, for example, the ship cannot return to the harbor by PTA on the monitor part 22 (Step S42).

Since other configuration and operation are similar to those of the traveling route generating system 201 according to the first embodiment described above, the detailed description will not be repeated in this embodiment.

As described above, the traveling route generating device 10 according to the second embodiment may receive, by the receiving part 21, the information on PTA at the home harbor HB. The route generating module 31 may generate the traveling route upon returning to the home harbor. The calculating module 35 may calculate the required time for traveling from the current location of the ship to the home harbor HB based on the traveling route generated by the route generating module 31, and then calculate the return-to-harbor start time of the ship based on the calculated required time, and the information on PTA. The display processing module 33 may notify the content based on the return-to-harbor start time calculated by the calculating module 35.

With such a configuration, the required time to the home harbor HB and the return-to-harbor start time which change while the ship travels, can be calculated more accurately. Therefore, the more suitable notification related to the return-to-harbor time can be issued.

Moreover, the traveling route generating device 10 according to the second embodiment, the route generating module 31 may update the traveling route. The calculating module 35 may newly calculate the required time based on the traveling route updated by the route generating module 31, and newly calculate the return-to-harbor start time based on the newly-calculated required time, and the information on PTA. The display processing module 33 may then notify the content based on the return-to-harbor start time newly calculated by the calculating module 35.

With such a configuration, since the traveling route upon returning to the harbor which changes while the ship travels can be grasped more accurately, the required time to the home harbor HB and the return-to-harbor start time can be calculated further accurately.

Moreover, the traveling route generating device 10 according to the second embodiment may further receive, by the receiving part 21, the home route HR. The route generating module 31 may generate the auto route AR1 between the destination D or the current location, and the location on the home route HR.

Thus, since the auto route AR1 between the destination D or the current location and the location on the home route HR is generated, the suitable traveling route which goes through the specific route demanded, for example, for each home harbor HB, can be established. Moreover, since the return-to-harbor start time based on the route on which the ship actually travels can be calculated, a more accurate notification of the return-to-harbor start time can be performed.

Moreover, the traveling route generating device 10 according to the second embodiment may notify, by the display processing module 33, the content based on the return-to-harbor start time before the return-to-harbor start time.

With such a configuration, the return-to-harbor start time can be grasped in advance.

Moreover, the traveling route generating device 10 according to the second embodiment may further determine, by the calculating module 35, whether the ship can return to the home harbor by PTA based on the required time and the information on PTA. If the calculating module 35 determines that the ship cannot return to the home harbor by PTA, the display processing module 33 may perform the given notification.

With such a configuration, the user can grasp in advance that the ship cannot return to the harbor by PTA.

Moreover, the traveling route generating device 10 according to the second embodiment may further calculate, by the calculating module 35, the recommended ship speed Sp1 based on the required time and the information on PTA. The display processing module 33 may notify the content based on the ship speed Sp1 calculated by the calculating module 35.

With such a configuration, the ship can travel at the suitable ship speed, for example, with which the ship can return to the harbor by PTA.

Moreover, in the method of notifying the return-to-harbor information according to the second embodiment, the receiving part 21 may first receive the information on PTA at the home harbor HB. The route generating module 31 may then generate the traveling route upon returning to the home harbor. The calculating module 35 may then calculate the required time from the current location of the ship to the home harbor HB based on the traveling route generated by the route generating module 31, and calculate the return-to-harbor start time of the ship based on the calculated required time and the information on PTA. The display processing module 33 may then notify the content based on the return-to-harbor start time calculated by the calculating module 35.

With such a method, the required time to the home harbor HB and the return-to-harbor start time which change while the ship travels can be calculated more accurately. Therefore, a more suitable notification related to the return-to-harbor time can be issued.

Moreover, in the method of notifying the return-to-harbor information according to the second embodiment, the route generating module 31 may then update the traveling route. The calculating module 35 may then newly calculate the required time based on the traveling route updated by the route generating module 31, and then newly calculate the return-to-harbor start time based on the newly-calculated required time and the information on the PTA. The display processing module 33 may then notify the content based on the return-to-harbor start time newly calculated by the calculating module 35.

With such a method, since the traveling route upon returning to the harbor which changes while the ship travels can be grasped more accurately, the required time to the home harbor HB and the return-to-harbor start time can be calculated further accurately.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately," "about," and "substantially" as used herein include the recited numbers, and also represent an amount close to the stated amount that still performs a desired function or achieves a desired result. For example, unless otherwise explicitly stated, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A traveling route generating device, comprising:
   a user interface configured to receive a home route that is a route on which a ship travels upon departing from a home harbor or upon returning to the home harbor, the home harbor being a location from which the ship departs; and
   processing circuitry configured to, once the home route is received through the user interface,
      generate a traveling route between one of a destination of the ship and a current location of the ship, and a location on the home route,
      combine the traveling route and the home route to create a combined travel route from the home harbor to the destination or from the current location to the home harbor,
      control a display to display information pertaining to the combined travel route; and
      control the display to display the traveling route and the home route in a mutually different displaying manner.

2. The traveling route generating device of claim 1, wherein the user interface receives a change in the home route.

3. The traveling route generating device of claim 1, wherein the processing circuitry is further configured to determine the traveling route by generating either one of the traveling route between one of the destination of the ship and the current location, and the location on the home route, and the traveling route between one of the destination of the ship and the current location, and the home harbor.

4. The traveling route generating device of claim 3, wherein the processing circuitry determines the traveling route based on whether the current location of the ship satisfies a given condition.

5. The traveling route generating device of claim 1, wherein the processing circuitry is further configured to perform a given notification upon returning to the home harbor, when a distance between the current location of the ship and the home route is below a given value.

6. The traveling route generating device of claim 1, wherein:
   the user interface further receives an information related to a planned time of arrival at the home harbor; and
   the processing circuitry is further configured to:
      calculate a required time for traveling from the current location of the ship to the home harbor based on the traveling route, and calculate a return-to-harbor start time of the ship based on the required time and the information related to the planned time of arrival,
      notify a content based on the return-to-harbor start time,
      update the traveling route,
      newly calculate the required time based on the updated traveling route, and newly calculate the return-to-harbor start time based on the newly-calculated required time and the information related to the planned time of arrival, to generate a newly-calculated return-to-harbor start time, and
      notify the content based on the newly-calculated return-to-harbor start time.

7. The traveling route generating device of claim 6, wherein the processing circuitry is further configured to notify the content before the return-to-harbor start time.

8. The traveling route generating device of claim 6, wherein the processing circuitry is further configured to:
   determine whether the ship can return to the home harbor by the planned time of arrival based on the required time and the information related to the planned time of arrival, and
   perform a given notification when determined that the ship cannot return to the home harbor by the planned time of arrival.

9. The traveling route generating device of claim 6, wherein the processing circuitry is further configured to:
   calculate a recommended ship speed based on the required time and the information related to the planned time of arrival, and
   notify a content based on the recommended ship speed.

10. A method of generating a traveling route by a traveling route generating device, comprising:
    receiving a home route that is a route on which a ship travels upon departing from a home harbor or upon returning to the home harbor, the home harbor being a location from which the ship departs; and
    once the home route is received through a user interface, generating a traveling route between one of a destination of the ship and a current location of the ship, and a location on the home route, combining the traveling route and the home route to create a combined travel route from the home harbor to the destination or from the current location to the home harbor, controlling a display to display information pertaining to the combined travel route; and controlling the display to display the traveling route and the home route in a mutually different displaying manner.

11. The method of generating a traveling route by a traveling route generating device of claim 10, wherein
the receiving receives a change in the home route.

12. The method of generating a traveling route by a traveling route generating device of claim 10, further comprising:
determining the traveling route by generating either one of the traveling route between one of the destination of the ship and the current location, and the location on the home route, and the traveling route between one of the destination of the ship and the current location, and the home harbor.

13. The method of generating a traveling route by a traveling route generating device of claim 12, further comprising:
determining the traveling route based on whether the current location of the ship satisfies a given condition.

14. A non-transitory computer-readable medium having stored thereon computer-executable instructions which, when executed by a computer, cause the computer to:
receive a home route that is a route on which a ship travels upon departing from a home harbor or upon returning to the home harbor, the home harbor being a location from which the ship departs; and once the home route is received through a user interface, generate a traveling route between one of a destination of the ship and a current location of the ship, and a location on the home route, combine the traveling route and the home route to create a combined travel route from the home harbor to the destination or from the current location to the home harbor, control a display to display information pertaining to the combined travel route; and control the display to display the traveling route and the home route in a mutually different displaying manner.

15. The non-transitory computer-readable medium accordingly to claim 14, wherein the computer-executable instructions cause the computer to receive a change in the home route.

16. The non-transitory computer-readable medium accordingly to claim 14, wherein the computer-executable instructions cause the computer to
determine the traveling route by generating either one of the traveling route between one of the destination of the ship and the current location, and the location on the home route, and the traveling route between one of the destination of the ship and the current location, and the home harbor.

17. The non-transitory computer-readable medium accordingly to claim 16, wherein the computer-executable instructions cause the computer to
determine the traveling route based on whether the current location of the ship satisfies a given condition.

* * * * *